United States Patent
Nakajima et al.

(10) Patent No.: US 8,155,818 B2
(45) Date of Patent: Apr. 10, 2012

(54) VEHICLE CONTROL SYSTEM

(75) Inventors: Kenji Nakajima, Chiyoda-ku (JP);
Toshihide Satake, Chiyoda-ku (JP);
Hiroshi Fujioka, Chiyoda-ku (JP);
Takanori Matsunaga, Chiyoda-ku (JP);
Masahiko Kurishige, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 416 days.

(21) Appl. No.: 12/307,873

(22) PCT Filed: Sep. 27, 2007

(86) PCT No.: PCT/JP2007/068809
§ 371 (c)(1),
(2), (4) Date: Jan. 7, 2009

(87) PCT Pub. No.: WO2008/038713
PCT Pub. Date: Apr. 3, 2008

(65) Prior Publication Data
US 2009/0204284 A1  Aug. 13, 2009

(30) Foreign Application Priority Data

Sep. 28, 2006 (JP) ................ 2006-264905

(51) Int. Cl.
*G01M 17/00* (2006.01)
(52) U.S. Cl. .................................. 701/29.1
(58) Field of Classification Search ........... 701/27, 701/29–34, 400; 244/184; 280/5, 734
See application file for complete search history.

(56) References Cited

U.S. PATENT DOCUMENTS

| | | |
|---|---|---|
| 7,398,145 B2 | 7/2008 | Kato et al. |
| 2003/0051560 A1 | 3/2003 | Ono et al. |
| 2003/0220730 A1 | 11/2003 | Fujioka et al. |
| 2004/0019417 A1 | 1/2004 | Yasui et al. |
| 2005/0055149 A1 | 3/2005 | Kato et al. |

FOREIGN PATENT DOCUMENTS

| | | |
|---|---|---|
| JP | 2001-191820 A | 7/2001 |
| JP | 2003-127888 A | 5/2003 |
| JP | 2003-312465 A | 11/2003 |
| JP | 2003-341538 A | 12/2003 |
| JP | 2004074845 A | 3/2004 |
| JP | 2005-081924 A | 3/2005 |
| JP | 2005-324737 A | 11/2005 |
| JP | 2005-329798 A | 12/2005 |

OTHER PUBLICATIONS

German Office Action dated Jul. 13, 2009, along with English language translation.

*Primary Examiner* — Mary Cheung
(74) *Attorney, Agent, or Firm* — Sughrue Mion, PLLC

(57) ABSTRACT

Provided is a vehicle control system which can maintain stability of the vehicle with an inexpensive configuration without bringing discomfort to a driver when control intervenes. The vehicle control system includes: road surface reaction torque detecting means 15 for detecting an actual road surface reaction torque Talign received by a tire 9 of the vehicle from a road surface; steering angle detecting means 5 for detecting a steering angle θ of a handle 2 of the vehicle; vehicle speed detecting means 10 for detecting a vehicle speed V of the vehicle; reference road surface reaction torque computing means 16 for computing a reference road surface reaction torque Tref corresponding to a linear road surface reaction torque based on the steering angle θ and the vehicle speed V; behavior state estimating means 17 for estimating a behavior state of the vehicle based on at least one of a deviation and a ratio between the actual road surface reaction torque Talign and the reference road surface reaction torque Tref; and driving force control means 18 for controlling a driving force of the vehicle according to the behavior state.

12 Claims, 12 Drawing Sheets

VEHICLE CONTROL SYSTEM

TECHNICAL FIELD

The present invention relates to a vehicle control system, which estimates a behavior state of the vehicle based on at least one of a deviation and ratio between an actual road surface reaction torque and a reference road surface reaction torque and controls a driving force of the vehicle depending on the estimated behavior state to maintain stability of the vehicle.

BACKGROUND ART

A conventional behavior controller for a vehicle is a behavior controller including control means for estimating a state of the vehicle when the vehicle is making a turn and controlling a yaw rate behavior of the vehicle based on the result of the estimation. The behavior controller has a continuously variable transmission for continuously varying rotation power of an engine. The control means controls a behavior of the vehicle by the continuously variable transmission.

The behavior control includes behavior controls by the engine, a brake, and the continuously variable transmission. The priority of the intervention of the behavior control is set in order of the behavior control by the continuously variable transmission, the behavior control by the engine, and the behavior control by the brake (for example, see Patent Document 1).

Moreover, a conventional motion controller for a vehicle includes steering force index detecting means, self-aligning torque estimating means, vehicle state quantity detecting means, front-wheel index estimating means, gripping performance estimating means, and control means.

The steering force index detecting means detects at least one of steering force indices including a steering torque and steering force applied to a steering system of the vehicle. The self-aligning torque estimating means estimates an actual self-aligning torque (actual road surface reaction torque) generated on a front wheel of the vehicle based on a detection signal of the steering force index detecting means. The vehicle state quantity detecting means detects a state quantity of the vehicle. The front-wheel index estimating means detects at least one of front-wheel indices including a side force and a front-wheel slip angle on the front wheel of the vehicle based on a detection signal of the vehicle state quantity detecting means. The gripping performance estimating means estimates gripping performance with respect to at least the front wheel of the vehicle based on a change in the estimated actual self-aligning torque with respect to the estimated front wheel index. The control means controls at least one of a braking force for the vehicle, an engine output, and a gear shift position according to the detection signal of the vehicle state quantity detecting means (for example, see Patent Document 2).

In the conventional device of Patent Document 1 described above, the control means estimates the state of the vehicle when the vehicle is making a turn based on a deviation between a target yaw rate and an actual yaw rate, and executes the behavior control when an unstable state of the vehicle such as understeer and oversteer is detected.

Here, by executing the behavior control by the continuously variable transmission in priority to the behavior control by the brake, an excessive reduction in torque by the brake is prevented not to bring discomfort to a driver. Moreover, by executing the behavior control by the continuously variable transmission in priority to the behavior control by the engine, the rotations of the engine are prevented from being excessively reduced.

In the conventional device of Patent Document 1 described above, however, the unstable state of the vehicle is detected based on the deviation between the target yaw rate and the actual yaw rate. Therefore, the behavior control is executed after the vehicle itself falls into the unstable state.

Accordingly, there is a problem that a delay in intervention of the behavior control brings discomfort to the driver.

In order to solve the problem, in the conventional device described in Patent Document 2 described above, the gripping performance of the front wheel is estimated based on a change in the actual self-aligning torque with respect to the side force on the front wheel of the vehicle or the front wheel slip angle in order to detect the unstable state of the vehicle in an early stage. The estimated gripping performance is used to detect a traveling state of the vehicle.

Here, the actual self-aligning torque is obtained by subtracting a friction component of a steering system from an actual reaction torque corresponding to the sum of a torque acting on a steering shaft by an steering operation of the driver and a torque output from an electric power steering device.

[Patent Document 1] JP 2001-191820 A
[Patent Document 2] JP 2003-312465 A

DISCLOSURE OF THE INVENTION

Problems to be Solved by the Invention

In the motion controller for the vehicle, which is described in Patent Document 2 described above, there is a problem that cost is increased because a yaw rate sensor for detecting a yaw rate of the vehicle and a lateral acceleration sensor for detecting a lateral acceleration of the vehicle are required to estimate the side force on the front wheel of the vehicle or the front wheel slip angle.

Moreover, a method of computing the side force on the front wheel of the vehicle or the front wheel slip angle is complicated, and therefore, the computation imposes a high load. Accordingly, there is another problem that the cost is further increased because a microcomputer having high computation processing performance is required.

Further, since the actual self-aligning torque is obtained by removing a hysteresis characteristic corresponding to the friction component as a disturbance of a steady-state value from the actual reaction torque generated on the steering shaft of the vehicle, there is still another problem that the estimation accuracy of the actual self-aligning torque is lowered for a radio frequency disturbance such as a vibration received from unevenness of a road surface or the like.

Further, it is considered that the radio frequency disturbance is cancelled by causing the actual reaction torque to pass through a low-pass filter. In this case, however, there is still another problem that a phase delay or a gain shift is generated with respect to the actual road surface reaction force.

The present invention is to solve the problems as described above, and has an object of providing a vehicle control system, which is capable of maintaining stability of the vehicle with an inexpensive configuration without giving discomfort to a driver when control intervenes.

Means for Solving the Problems

A vehicle control system according to the present invention includes: road surface reaction torque detecting means for detecting an actual road surface reaction torque received by a tire of the vehicle from a road surface; steering angle detecting means for detecting a steering angle of a handle of the vehicle; vehicle speed detecting means for detecting a vehicle speed of the vehicle; reference road surface reaction torque computing means for computing a reference road surface reaction torque corresponding to a linear road surface reaction torque based on the steering angle and the vehicle speed; behavior state estimating means for estimating a behavior state of the vehicle based on at least one of a deviation and a ratio between the actual road surface reaction torque and the reference road surface reaction torque; and driving force control means for controlling a driving force of the vehicle according to the behavior state.

EFFECTS OF THE INVENTION

According to the vehicle control system of the present invention, the stability of the vehicle is maintained by estimating the behavior state of the vehicle based on at least one of the deviation and the ratio between the actual road surface reaction torque and the reference road surface reaction torque before the vehicle itself falls into the unstable state and controlling the driving force of the vehicle according to the estimated behavior state. Therefore, the stability of the vehicle can be maintained with an inexpensive configuration without bringing discomfort to the driver when the control intervenes, thereby improving the safety.

BEST MODE FOR CARRYING OUT THE INVENTION

Hereinafter, each of embodiments of the present invention is described based on the drawings. In each drawing, the same or equivalent members and parts are denoted by the same references for description.

EXAMPLE 1

Figure 1:
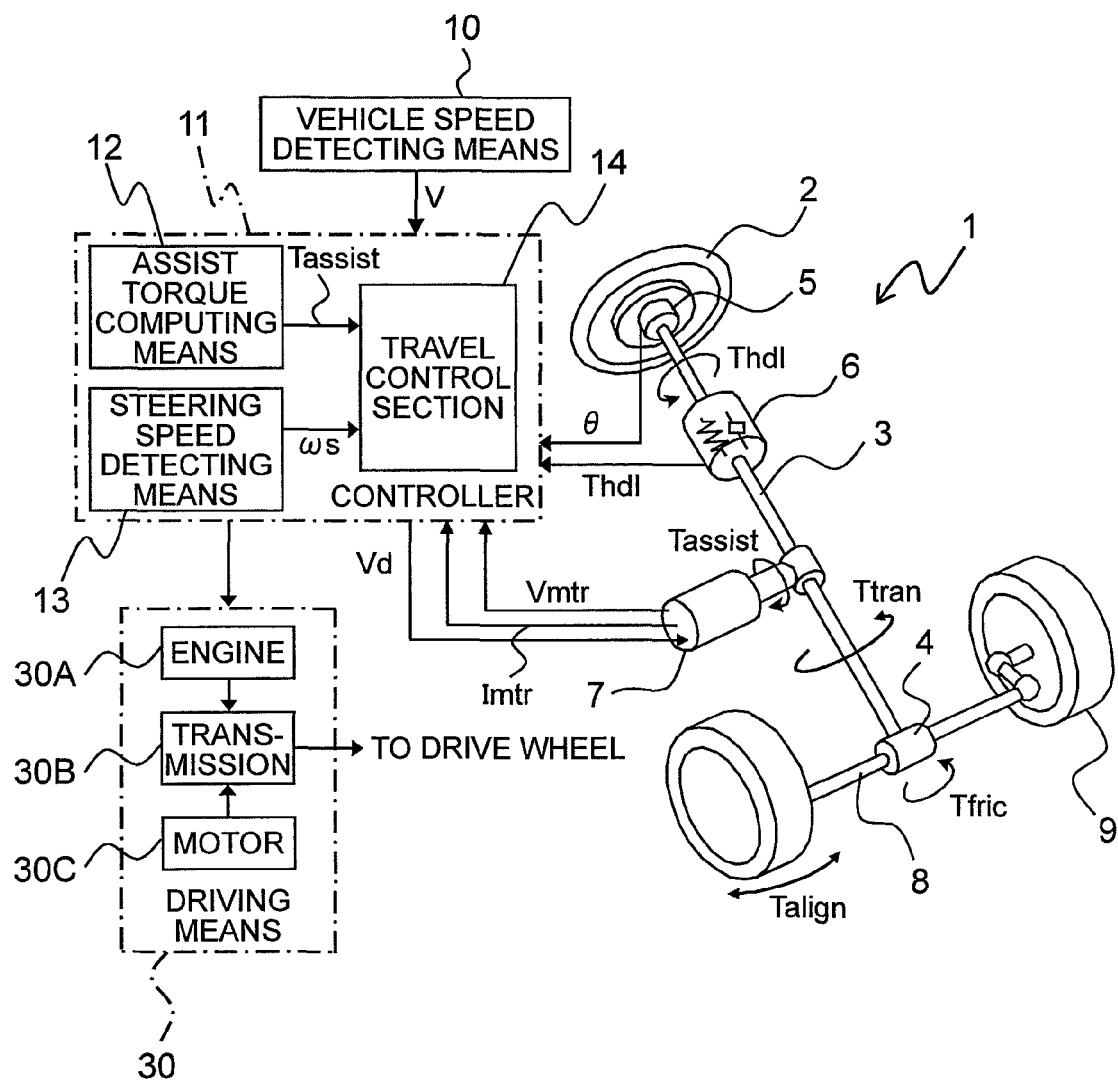
FIG. 1 A configuration view illustrating a steering mechanism of a vehicle control system according to a first embodiment of the present invention together with driving means (Example 1).

FIG. 1 is a configuration view illustrating a steering mechanism 1 of a vehicle control system according to a first embodiment of the present invention together with driving means 30.

In FIG. 1, the steering mechanism 1 includes a handle 2, a steering shaft 3, a steering gear box 4, steering angle detecting means 5, a torque sensor 6 (steering torque detecting means), an assist motor 7, a rack-and-pinion mechanism 8, tires 9, vehicle speed detecting means 10, and a controller 11.

Moreover, the driving means 30 is connected to the controller 11. The driving means 30 includes an engine 30A for driving a vehicle, a transmission 30B for transferring the drive of the vehicle, and a motor 30C for driving the vehicle. As another configuration, the engine 30A alone or the motor 30C alone may be included in place of both the engine 30A and the motor 30C. Outputs of the engine 30A and the motor 30C are transferred to a drive wheel via the transmission 30B.

Here, an ECU (not shown) for controlling the engine 30A, an ECU (not shown) for controlling the transmission 30B, and an ECU (not shown) for controlling the motor 30C are connected to the controller 11 through a communication bus (not shown) such as a control area network (CAN).

In an intake air path of the engine 30A, a mechanical throttle valve operating in cooperation with an accelerator pedal and a motor throttle valve driven to be opened/closed by a throttle motor are provided in series as described in, for example, Japanese Patent No. 2850648.

The transmission 30B is provided with a shift solenoid valve for switching a transmission gear ratio as described in, for example, Japanese Patent No. 3087439.

The handle 2 steered by a driver of the vehicle is coupled to an end of the steering shaft 3. Moreover, the steering angle detecting means 5 for detecting a steering angle θ to output the detected steering angle to the controller 11 is attached to the handle 2.

The torque sensor 6 for detecting a steering torque Thdl by the steering of the driver to output the detected steering torque to the controller 11 is attached to the steering shaft 3. Moreover, the electric assist motor 7 for generating an assist torque Tassist for assisting the steering torque Thdl is attached to the steering shaft 3 through a reduction gear (not shown).

The steering gear box 4 for amplifying several fold a combined torque obtained by adding the steering torque Thdl and the assist torque Tassist is coupled to the other end of the steering shaft 3.

The tires 9 are connected to the steering gear box 4 through the rack-and-pinion mechanism 8.

The vehicle speed detecting means 10 detects a vehicle speed V of the vehicle to output the detected vehicle speed to the controller 11.

The controller 11 includes assist torque computing means 12 for computing the assist torque Tassist for assisting the steering torque Thdl, steering speed detecting means 13 for detecting a steering speed $\omega s$ of the handle 2 by the driver based on a differential value of a motor speed or the steering angle $\theta$, and a travel control section 14 for controlling a travel of the vehicle by using the steering angle $\theta$, the steering torque Thdl, the vehicle speed V, the assist torque Tassist, and the steering speed $\omega s$.

Here, the controller 11 is constituted by a microprocessor (not shown) including a CPU and a memory which stores a program therein. Each of blocks constituting the controller 11 is stored as software in the memory.

The vehicle control system has a main function of generating the assist torque Tassist according to the steering torque Thdl by the driver.

Specifically, electrically, the steering torque Thdl when the driver steers the handle 2 is detected by the torque sensor 6, and is input together with a motor detection current Imtr and a motor detection voltage Vmtr of the assist motor 7 to the controller 11. The controller 11 computes a target current value for causing the assist motor 7 to generate the assist torque Tassist based on the above-mentioned inputs, and applies an application voltage Vd to the assist motor 7.

Moreover, dynamically, the sum of the steering torque Thdl and the assist torque Tassist causes the steering shaft 3 to rotate against a steering shaft reaction torque Ttran generated on the steering shaft 3. Moreover, when the handle 2 is steered, an inertia torque generated by an inertia of the assist motor 7 also acts.

Therefore, let the inertia torque of the assist motor 7 be $J \cdot d\omega/dt$. Then, the steering shaft reaction torque Ttran is expressed by the following Formula (1).

$$Ttran = Thdl + Tassist - J \cdot d\omega/dt \quad (1)$$

Let a gear ratio of the reduction gear between the assist motor 7 and the steering shaft 3 be Ggear and a torque constant of the assist motor 7 be Kt. Then, the assist torque Tassist by the assist motor 7 is expressed by the following Formula (2) using the motor detection current Imtr.

$$Tassist = Ggear \cdot Kt \cdot Imtr \quad (2)$$

The steering shaft reaction torque Ttran is a value obtained by adding an actual road surface reaction torque Talign received by the tire 9 from a road surface and a friction torque Tfric corresponding to a friction force generated on the entire steering mechanism 1 (including the assist motor 7). Specifically, the steering shaft reaction torque Ttran is expressed by the following Formula (3).

$$Ttran = Talign + Tfric \quad (3)$$

Here, the friction torque Tfric is expressed by the following Formula (4) by multiplying an absolute value Tf_abs of the friction torque generated on the entire steering mechanism 1 by a sign of the differential value of the steering angle $\theta$ (that is, the steering speed). In the following Formula (4), sign(x) means that a sign of x is output.

[Expression 1]

$$Tfric = Tf\_abs \times sign\dot\theta \quad (4)$$

The controller 11 controls a current to make the computed target current value and the motor detection current Imtr be identical with each other, and applies the application voltage Vd corresponding to the current to the assist motor 7.

The assist motor 7 generates the assist torque Tassist obtained by multiplying the motor detection current Imtr by the torque constant Kt and the gear ratio Ggear of the reduction gear as expressed by the Formula (2) to assist the steering torque Thdl generated by the driver.

Figure 2:
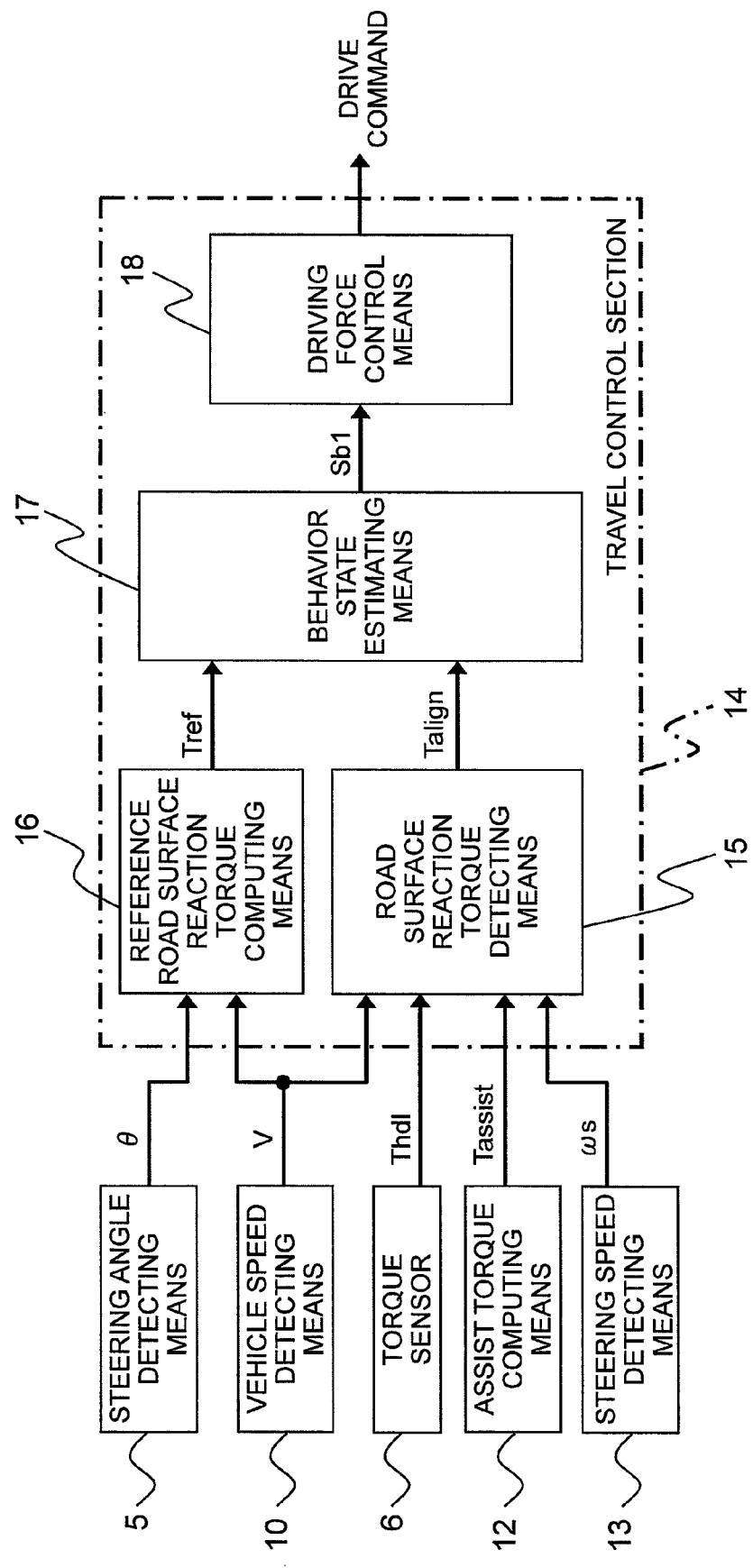
FIG. 2 A block diagram illustrating a travel control section of the vehicle control system according to the first embodiment of the present invention together with peripheral equipment (Example 1).

FIG. 2 is a block diagram illustrating the travel control section 14 of the vehicle control system according to the first embodiment of the present invention together with peripheral equipment.

In FIG. 2, the travel control section 14 includes road surface reaction torque detecting means 15, reference road surface reaction torque computing means 16, behavior state estimating means 17, and driving force control means 18. Moreover, the steering angle $\theta$, the steering torque Thdl, the vehicle speed V, the assist torque Tassist, and the steering speed $\omega s$ are input to the travel control section 14 respectively from the steering angle detecting means 5, the torque sensor 6, the vehicle speed detecting means 10, the assist torque computing means 12, and the steering speed detecting means 13.

The road surface reaction torque detecting means 15 detects the actual road surface reaction torque Talign which is received by the tire 9 of the vehicle from the road surface based on the steering torque Thdl, the vehicle speed V, the assist torque Tassist, and the steering speed $\omega s$. The reference road surface reaction torque computing means 16 computes the reference road surface reaction torque Tref which is a linear road surface reaction torque, based on the steering angle $\theta$ and the vehicle speed V.

The behavior state estimating means 17 estimates the behavior state of the vehicle based on at least one of a deviation and a ratio between the actual road surface reaction torque Talign and the reference road surface reaction torque Tref to output a behavior state estimation value Sb1. The driving force control means 18 outputs a drive command for controlling a driving force for the driving means 30 according to the behavior state estimation value Sb1.

The result of the detection by each of the detecting means, the result of the computation by each of the computing means, and the behavior state of the vehicle, which is estimated by the behavior state estimating means 17, are stored in the memory of the controller 11.

Moreover, although the controller 11 has various functions other than those illustrated, only the parts showing the characteristics of the present invention are described here.

Here, the road surface reaction torque detecting means 15 may detect the actual road surface reaction torque Talign by using the following method described in, for example, Japanese Patent Application Laid-open No. 2005-324737.

Figure 3:
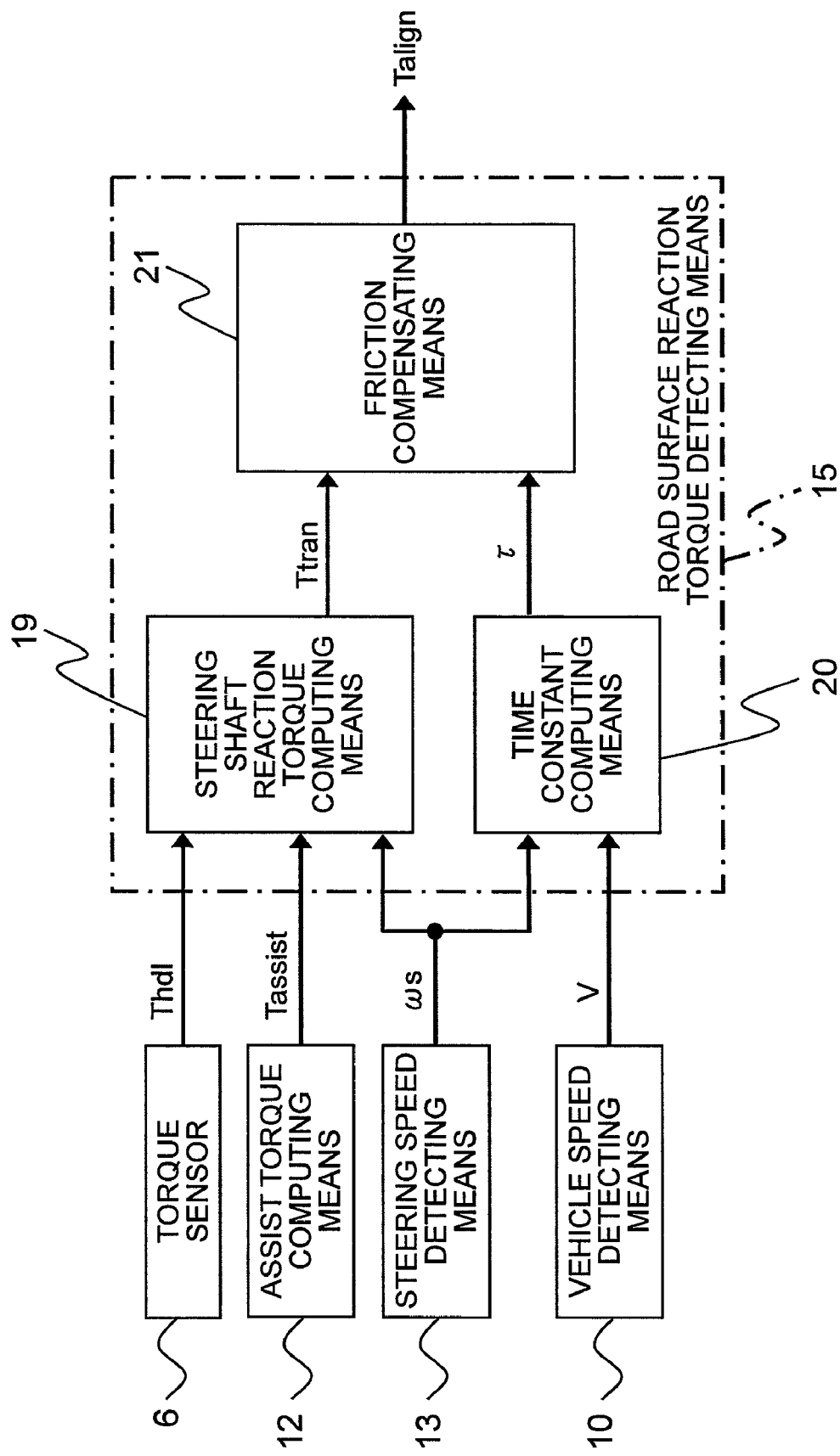
FIG. 3 A block diagram illustrating road surface reaction torque detecting means of the vehicle control system according to the first embodiment of the present invention together with the peripheral equipment (Example 1).

FIG. 3 is a block diagram illustrating the road surface reaction torque detecting means 15 of the vehicle control system according to the first embodiment of the present invention together with the peripheral equipment.

In FIG. 3, the road surface reaction torque detecting means 15 includes steering shaft reaction torque computing means 19, time constant computing means 20, and friction compensating means 21. Moreover, the steering torque Thdl, the vehicle speed V, the assist torque Tassist, and the steering speed $\omega s$ are input to the road surface reaction torque detecting means 15 respectively from the torque sensor 6, the vehicle speed detecting means 10, the assist torque computing means 12, and the steering speed detecting means 13.

The steering shaft reaction torque computing means 19 computes the steering shaft reaction torque Ttran generated on the steering shaft 3 based on the steering torque Thdl, the assist torque Tassist, and the steering speed ωs.

The time constant computing means 20 computes a time constant of a lowpass filter (described below) of the friction compensating means 21 based on the vehicle speed V and the steering speed ωs.

The friction compensating means 21 is constituted by the lowpass filter for which the time constant τ is computed by the time constant computing means 20, and outputs the actual road surface reaction torque Talign based on the steering shaft reaction torque Ttran.

Figure 4:
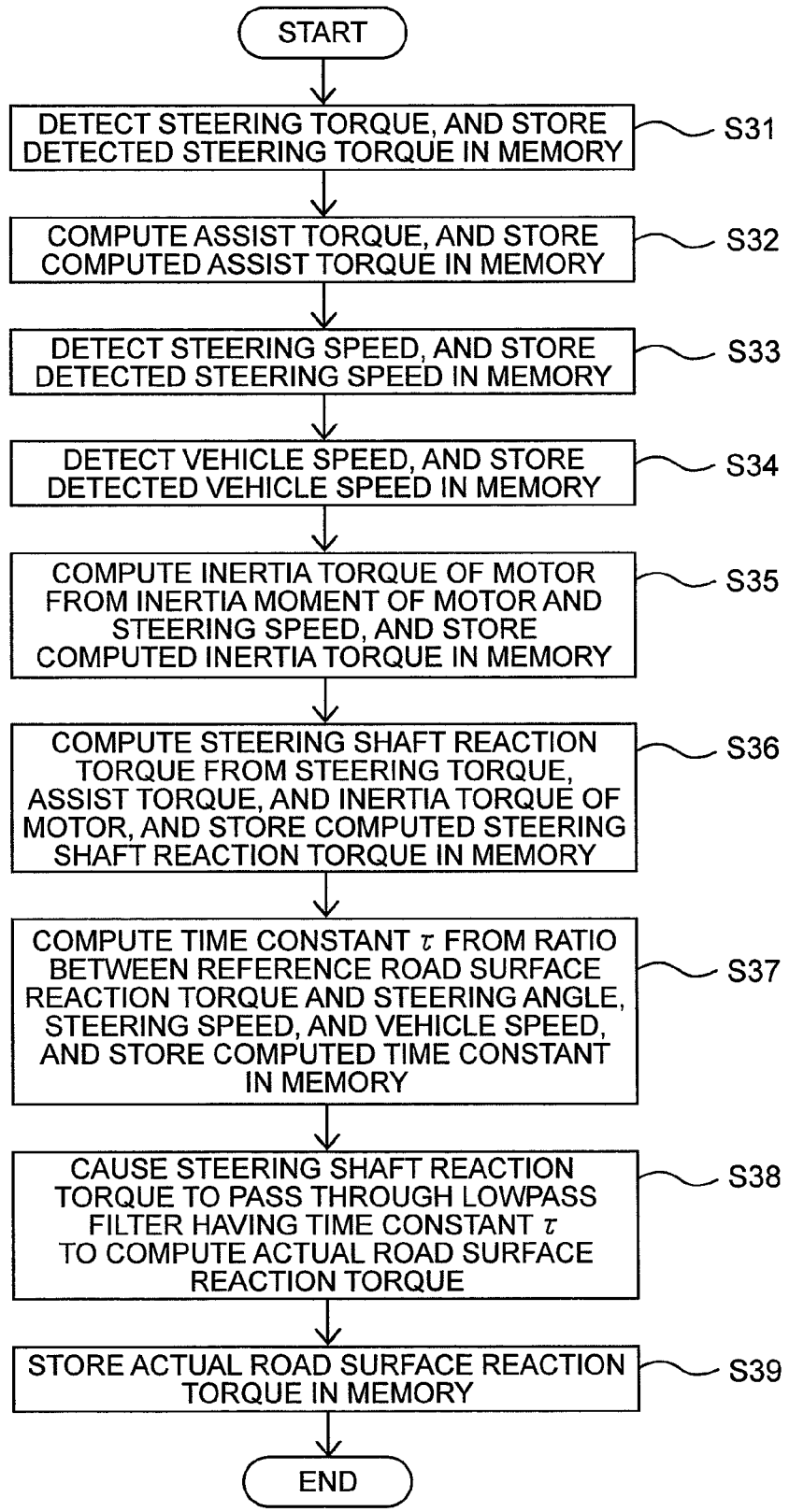
FIG. 4 A flowchart illustrating an operation of the road surface reaction torque detecting means according to the first embodiment of the present invention (Example 1).

Hereinafter, referring to a flowchart of FIG. 4 together with FIG. 3, an operation of the road surface reaction torque detecting means 15 according to the first embodiment of the present invention is described.

First, the steering torque Thdl is detected in the torque sensor 6, and is stored in the memory (Step S31).

Moreover, the assist torque Tassist is computed in the assist torque computing means 12 by using the above-mentioned Formula (2), and is stored in the memory (Step S32).

Subsequently, the steering speed ωs of the handle 2 is detected in the steering speed detecting means 13, and is stored in the memory (Step S33).

Moreover, the vehicle speed V is detected in the vehicle speed detecting means 10, and is stored in the memory (Step S34).

Next, the inertia torque J·dω/dt of the assist motor 7 is computed in the steering shaft reaction torque computing means 19 based on an inertial moment J of the assist motor 7 and the steering speed ωs stored in the memory, and is stored in the memory (Step S35).

Moreover, the steering shaft reaction torque Ttran is computed in the steering shaft reaction torque computing means 19 by using the above-mentioned Formula (1) based on the steering torque Thdl, the assist torque Tassist, and the inertia torque J·dω/dt of the assist motor 7, which are stored in the memory, and is stored in the memory (Step S36).

Subsequently, the time constant τ of the lowpass filter of the friction compensating means 21 is computed in the time constant computing means 20 based on a ratio Kalign (varying according to the vehicle speed V) between the reference road surface torque Tref and the steering angle θ, which are prestored in the memory, and the steering speed ωs and the vehicle speed V which are stored in the memory, and is stored in the memory (Step S37).

Here, the time constant τ is expressed by the following Formula (5) using the absolute value Tf_abs of the friction torque described above, which is generated on the entire steering mechanism 1. In the following Formula (5), Kalign is a proper value determined for each vehicle according to the vehicle speed V.

[Expression 2]

$$\tau = \frac{Tf\_abs}{Kalign(V) \times \omega s} \quad (5)$$

Next, the steering shaft reaction torque Ttran stored in the memory is caused to pass through the lowpass filter having the time constant τ stored in the memory to compute the actual road surface reaction torque Talign in the friction compensating means 21 (Step S38).

Here, the actual road surface reaction torque Talign is expressed by the following Formula (6). In the following Formula (6), LPFτ indicates a first-order lowpass filter having the time constant τ.

$$Talign = LPF\tau(Ttran) \quad (6)$$

Subsequently, the actual road surface reaction torque Talign computed as described above is stored in the memory (Step S39). Then, the processing of FIG. 4 is terminated.

Moreover, the reference road surface reaction torque computing means 16 computes the reference road surface reaction torque Tref by using the following Formula (7) based on the steering angle θ and the vehicle speed V. In the following Formula (7), Kalign is the above-mentioned ratio between the reference road surface reaction torque Tref and the steering angle θ.

$$Tref = Kalign(V) \times \theta \quad (7)$$

The reference road surface reaction torque computing means 16 may convert a yaw rate generated on the vehicle into the steering angle θ to compute the reference road surface reaction torque Tref by using Formula (7) based on the steering angle θ obtained by the conversion and the vehicle speed V as described in, for example, Japanese Patent Application Laid-open No. 2005-324737. Further, the reference road surface reaction torque computing means 16 may convert a lateral acceleration generated on the vehicle into the steering angle θ to compute the reference road surface reaction torque Tref by using Formula (7) based on the steering angle θ obtained by the conversion and the vehicle speed V or may use other known technologies.

Figure 5:
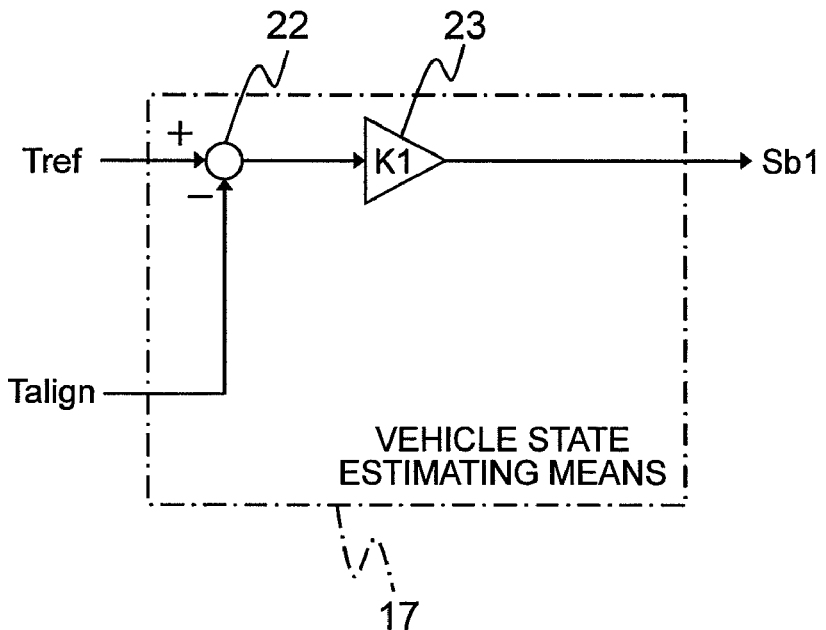
FIG. 5 A block diagram illustrating behavior state estimating means of the vehicle control system according to the first embodiment of the present invention (Example 1).

FIG. 5 is a block diagram illustrating the behavior state estimating means 17 of the vehicle control system according to the first embodiment of the present invention.

In FIG. 5, the behavior state estimating means 17 includes an adder-subtracter 22 for subtracting the actual road surface reaction torque Talign from the reference road surface reaction torque Tref to compute the deviation and a proportional gain 23 for multiplying the deviation between the reference road surface reaction torque Tref and the actual road surface reaction torque Talign by a gain value K1 to output the result of multiplication as the behavior state estimation value Sb1.

Here, the behavior state estimation value Sb1 is expressed by the following Formula (8).

$$Sb1 = K1 \times (Tref - Talign) \quad (8)$$

Figure 6:
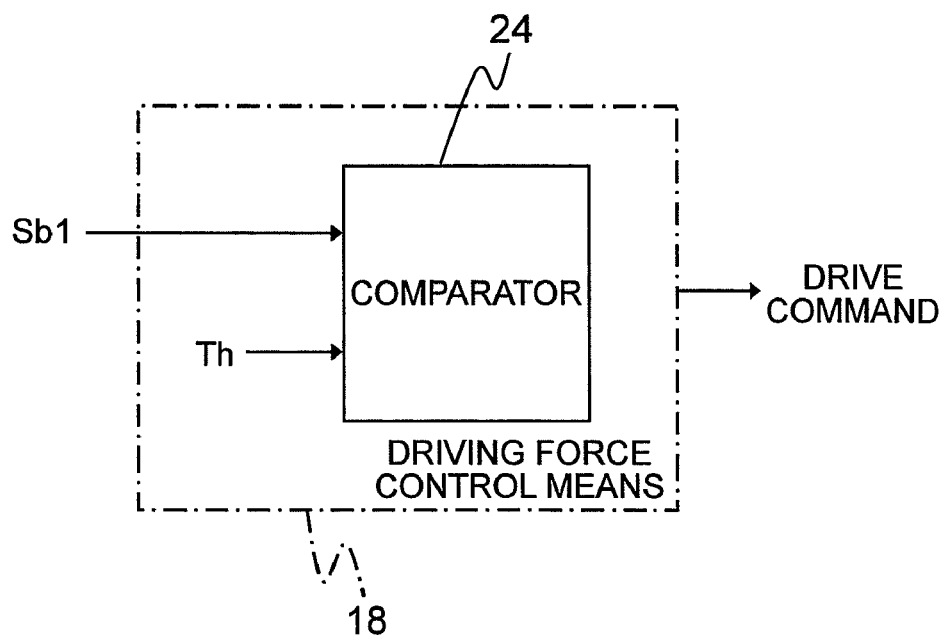
FIG. 6 A block diagram illustrating driving force control means of the vehicle control system according to the first embodiment of the present invention (Example 1).

FIG. 6 is a block diagram illustrating the driving force control means 18 of the vehicle control system according to the first embodiment of the present invention.

In FIG. 6, the driving force control means 18 includes a comparator 24 for comparing the behavior state estimation value Sb1 output from the behavior state estimating means 17 and a preset arbitrary threshold value Th with each other.

The driving force control means 18 puts a driving force control flag up when it is judged in the comparator 24 that the behavior state estimation value Sb1 is larger than the threshold value Th and, at the same time, outputs a drive command for controlling the driving force to at least one of the ECU of the engine 30A, the ECU of the transmission 30B, and the ECU of the motor 30C to decrease the driving force.

The decreased driving force reduces the speed of the vehicle to maintain the stability of the vehicle.

Here, more specifically, the driving force control means 18 controls a throttle motor for driving the motor throttle valve provided in an intake passage of the engine 30A to be opened/closed, thereby decreasing the driving force corresponding to an engine output.

Moreover, the driving force control means 18 controls the shift solenoid valve provided to the transmission 30B to switch a transmission gear ratio to decrease the driving force.

Alternatively, the driving force control means 18 may control the voltage to be applied to the motor 30C to decrease the driving force corresponding to a motor output.

The method of controlling the driving force is not limited to the above-mentioned method, and other known technologies may be used. Moreover, the present invention can be applied to all the vehicles which have a configuration capable of controlling the driving force.

Figure 7:
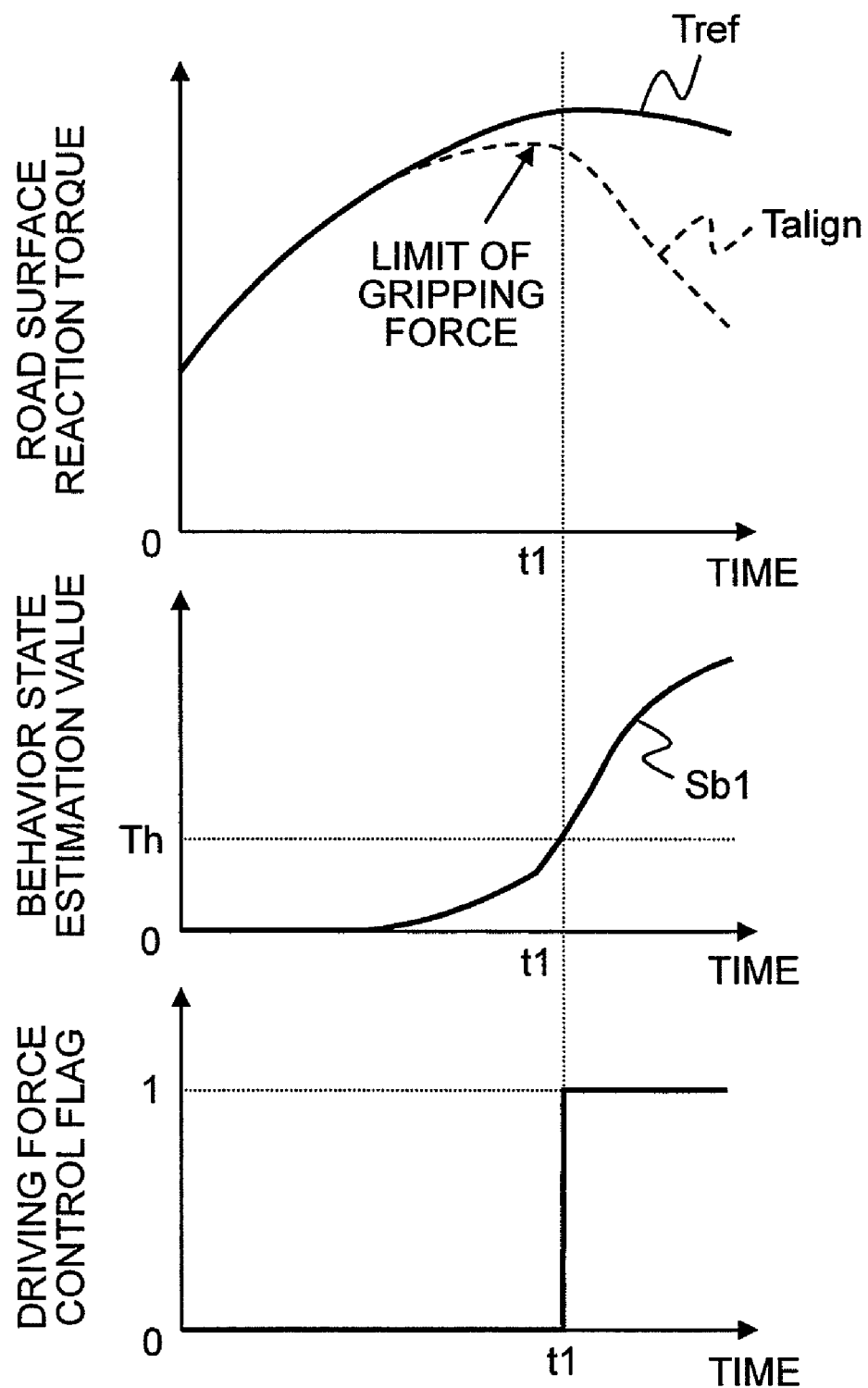
FIG. 7 A timing chart illustrating changes in a reference road surface reaction torque, an actual road surface reaction torque, a behavior state estimation value, and a driving force control flag of the vehicle control system according to the first embodiment of the present invention (Example 1).

FIG. 7 is a timing chart illustrating changes in the reference road surface reaction torque Tref, the actual road surface reaction torque Talign, the behavior state estimation value Sb1, and the driving force control flag of the vehicle control system according to the first embodiment of the present invention.

In FIG. 7, when a gripping force of the tire 9 reaches its limit to place the vehicle into an unstable state such as understeer, the actual road surface reaction torque Talign is saturated to generate a deviation between the reference road surface reaction torque Tref and the actual road surface reaction torque Talign.

At this time, the behavior state estimation value Sb1 output from the behavior state estimating means 17 starts increasing to be larger than the threshold value Th at a time t1. Moreover, the driving force control means 18 puts the driving force control flag up at the time t1, and outputs the drive command for controlling the driving force to the driving means 30.

Here, a relation between a turning radius of the vehicle and the vehicle speed V is described. Let the turning radius be L, the lateral acceleration generated on the vehicle be Gy, and the yaw rate (including a side slipping angular speed) generated on the vehicle be $\gamma$. Then, the turning radius of the vehicle is expressed by the following Formula (9).

[Expression 3]

$$L = \frac{V^2}{Gy} = \frac{V}{\gamma} \quad (9)$$

In Formula (9), in order to reduce the turning radius L of the vehicle, it is sufficient to increase the lateral acceleration Gy or the yaw rate $\gamma$ in a denominator term or to decrease the vehicle speed V in a numerator term. When the vehicle is in the unstable state such as understeer, however, the actual road surface reaction torque Talign of the front tire 9 is saturated and the gripping force of the tire 9 reaches its limit. Therefore, the lateral acceleration Gy and the yaw rate $\gamma$ are also in a saturated state, which prevents the lateral acceleration Gy and the yaw rate $\gamma$ from being increased.

Accordingly, in order to reduce the turning radius L of the vehicle, it is understood that the reduction of the vehicle speed V is effective.

Figure 8:
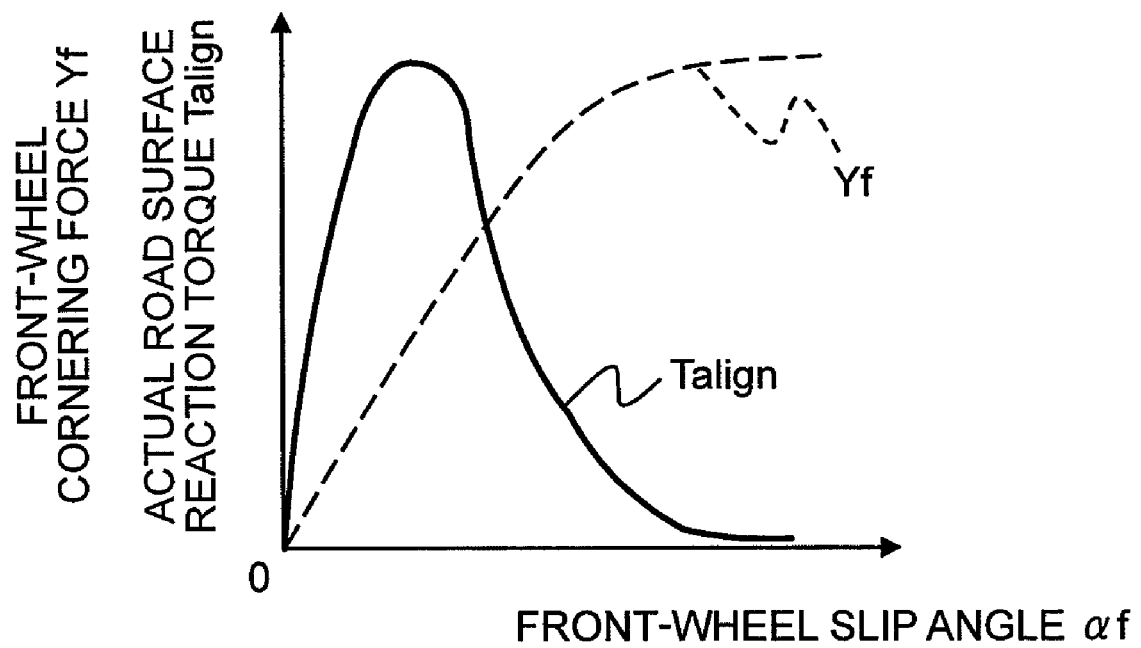
FIG. 8 An explanatory view illustrating a general relation between a front-wheel cornering force and the actual road surface reaction torque with respect to a front-wheel slip angle (Example 1).

FIG. 8 is an explanatory view illustrating a general relation between a front-wheel cornering force Yf (side force) and the actual road surface reaction torque Talign with respect to a front-wheel slip angle $\alpha$f.

In FIG. 8, it is understood that the actual road surface reaction torque Talign is saturated earlier than the front-wheel cornering force Yf with respect to the front-wheel slip angle $\alpha$f.

Here, let a distance from a point of center of gravity of the vehicle to a front axle be Lf, a distance from the point of center of gravity of the vehicle to a rear axle be Lr, the front-wheel cornering force be Yf, a rear-wheel cornering force be Yr, and an inertia moment about a Z-axis of the vehicle itself be i. Then, the yaw rate $\gamma$ generated on the vehicle is expressed by the following Formula (10).

[Expression 4]

$$\gamma = \frac{(Lf \times Yf) - (Lr \times Yr)}{i} \quad (10)$$

From Formula (10) and FIG. 8, it is understood that the actual road surface reaction torque Talign is saturated earlier than the yaw rate $\gamma$.

Therefore, the use of the actual road surface reaction torque Talign enables early detection of the unstable state of the vehicle such as understeer as compared with the use of the yaw rate $\gamma$. Moreover, since the yaw rate sensor or the lateral acceleration sensor is not required to be used, the behavior state of the vehicle can be estimated with an inexpensive configuration.

Figure 9:
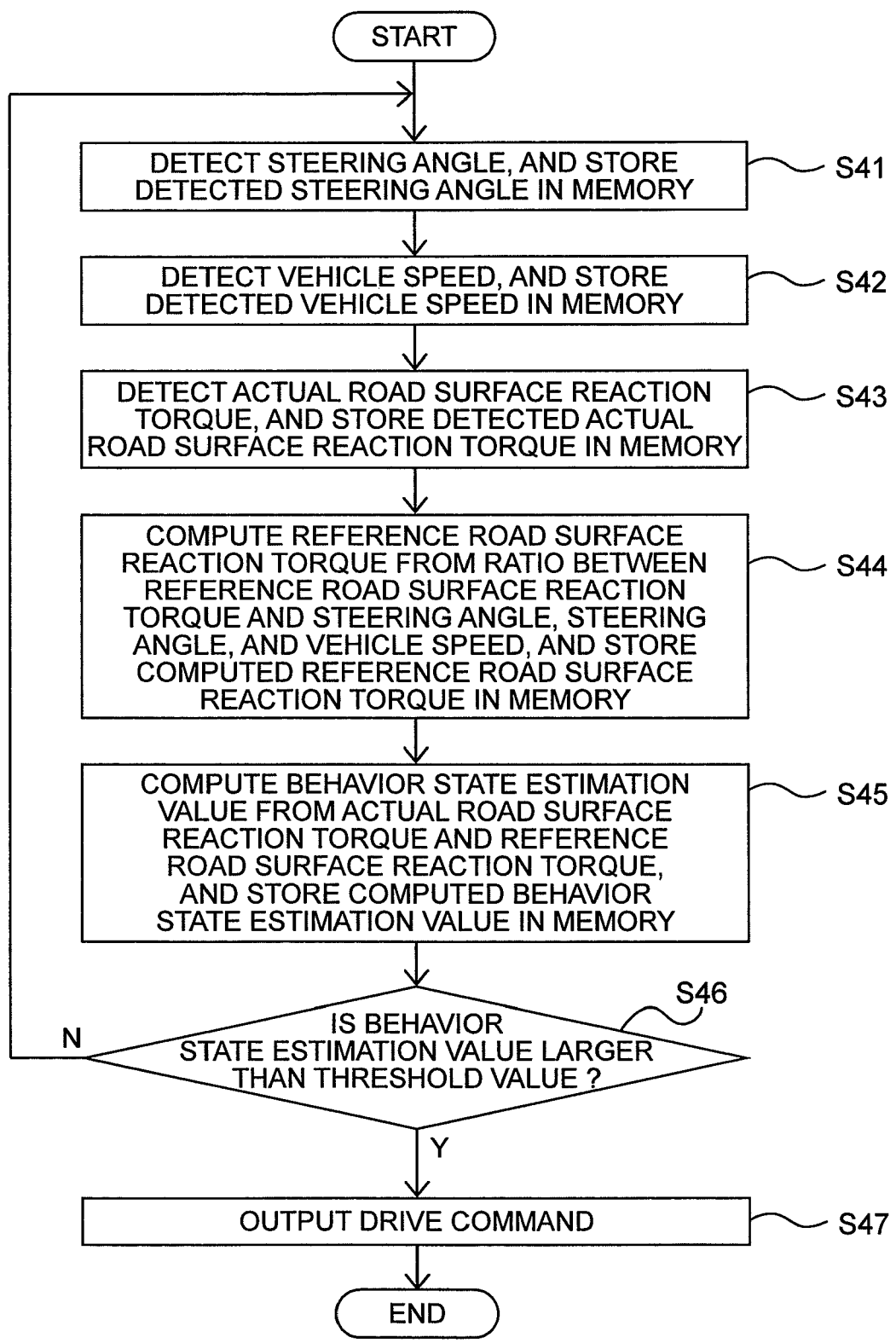
FIG. 9 A flowchart illustrating an operation of the vehicle control system according to the first embodiment of the present invention (Example 1).

Hereinafter, referring to a flowchart of FIG. 9 together with FIGS. 1 to 8, an operation of the vehicle control system according to the first embodiment of the present invention is described.

First, the steering angle $\theta$ is detected by the steering angle detecting means 5, and is stored in the memory (Step S41).

Moreover, the vehicle speed V is detected by the vehicle speed detecting means 10, and is stored in the memory (Step S42).

Subsequently, the actual road surface reaction torque Talign is detected by the road surface reaction torque detecting means 15, and is stored in the memory (Step S43).

Next, the reference road surface reaction torque Tref is computed by the reference road surface reaction torque computing means 16 based on the ratio Kalign (varying according to the vehicle speed V) of the reference road surface reaction torque Tref to the steering angle $\theta$, which is prestored in the memory, and the steering angle $\theta$ and the vehicle speed V which are stored in the memory, and is stored in the memory (Step S44).

Subsequently, the behavior state estimation value Sb1 is computed by using the above-mentioned Formula (8) in the behavior state estimating means 17, and is stored in the memory (Step S45).

Next, it is judged in the driving force control means 18 whether or not the behavior state estimation value Sb1 is larger than the threshold value Th (Step S46).

When it is judged in Step S46 that the behavior state estimation value Sb1 is larger than the threshold value Th (that is, Yes), the drive command for controlling the driving force is output from the driving force control means 18 to the driving means 30 (Step S47). Then, the processing of FIG. 9 is terminated.

On the other hand, when it is judged in Step S46 that the behavior state estimation value Sb1 is equal to or smaller than the threshold value Th (that is, No), the processing immediately transits to Step S41.

According to the vehicle control system according to the first embodiment of the present invention, the behavior state estimating means 17 computes the behavior state estimation value Sb1 based on the deviation between the actual road surface reaction torque Talign and the reference road surface reaction torque Tref. The driving force control means 18 uses the behavior state estimation value Sb1 to judge the unstable state of the vehicle. As a result, in comparison with the case where the yaw rate is used, the driving force of the vehicle can be controlled in the earlier stage.

Therefore, it is possible to allow the control of the driving force to intervene without giving discomfort to the driver.

Moreover, since the road surface reaction torque detecting means 15 uses the lowpass filter having the variable time constant to compute the actual road surface reaction torque Talign, the effects of noise can be reduced.

Further, since a sensor such as the yaw rate sensor or the lateral acceleration sensor and complicated computation are not required, the stability of the vehicle can be maintained with an inexpensive configuration to improve the safety.

EXAMPLE 2

Figure 10:
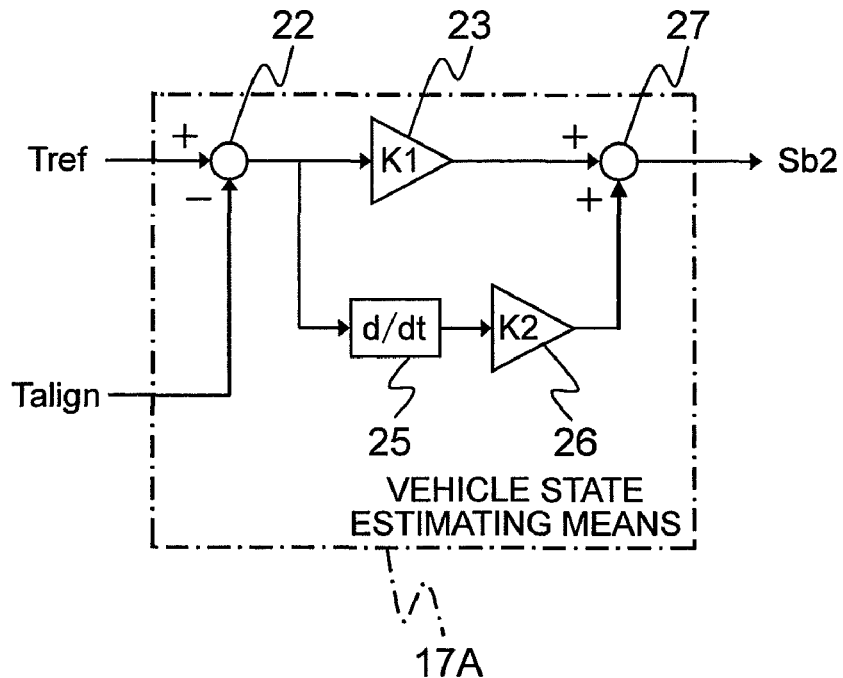
FIG. 10 A block diagram illustrating behavior state estimating means of a vehicle control system according to a second embodiment of the present invention (Example 2).

FIG. 10 is a block diagram illustrating behavior state estimating means 17A of a vehicle control system according to a second embodiment of the present invention.

In FIG. 10, the behavior state estimating means 17A includes the adder-subtracter 22 for subtracting the actual road surface reaction torque Talign from the reference road surface reaction torque Tref to compute the deviation, the proportional gain 23 for multiplying the deviation between the reference road surface reaction torque Tref and the actual road surface reaction torque Talign by the gain value K1, a differentiator 25 for differentiating the deviation between the reference road surface reaction torque Tref and the actual road surface reaction torque Talign, a differential gain 26 for multiplying a differential value of the deviation, which is output from the differentiator 25, by a gain value K2, and an adder 27 for adding an output of the proportional gain 23 and an output of the differential gain 26 to output the result of addition as a behavior state estimation value Sb2.

Here, the behavior state estimation value Sb2 is expressed by the following Formula (11). In the following Formula (11), d/dt represents a temporal differentiation.

[Expression 5]

$$Sb2 = K1 \times (Tref - Talign) + K2 \times \frac{d}{dt}(Tref - Talign) \quad (11)$$

Moreover, the comparator 24 of the driving force control means 18 compares the behavior state estimation value Sb2 output from the behavior state estimating means 17A and the preset arbitrary threshold value Th with each other.

The other configuration and operation are the same as those of the first embodiment described above, and therefore, the description thereof is omitted.

According to the vehicle control system according to the second embodiment of the present invention, the same effects as those of the first embodiment described above can be produced.

EXAMPLE 3

Figure 11:
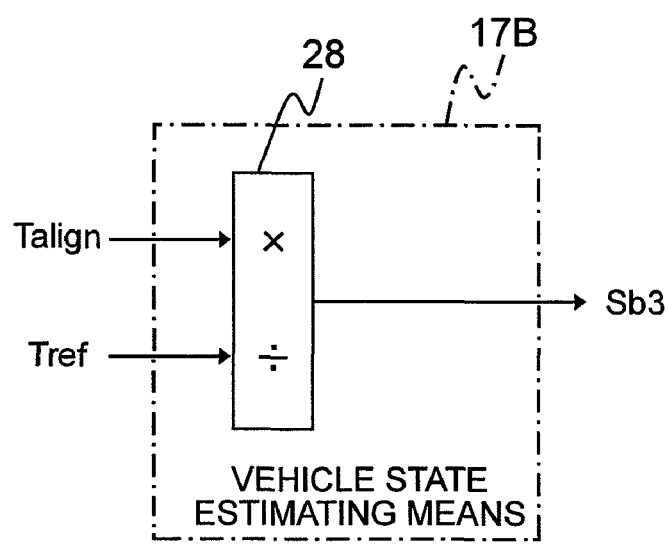
FIG. 11 A block diagram illustrating behavior state estimating means of a vehicle control system according to a third embodiment of the present invention (Example 3).

FIG. 11 is a block diagram illustrating behavior state estimating means 17B of a vehicle control system according to a third embodiment of the present invention.

In FIG. 11, the behavior state estimating means 17B includes a divider 28 for dividing the actual road surface reaction torque Talign by the reference road surface reaction torque Tref to obtain a ratio and outputting the obtained ratio as a behavior state estimation value Sb3.

Here, the behavior state estimation value Sb3 is expressed by the following Formula (12).

[Expression 6]

$$Sb3 = \frac{Talign}{Tref} \quad (12)$$

In Formula (12), since the actual road surface reaction torque Talign is saturated when the vehicle falls into the unstable state such as understeer, the behavior state estimation value Sb3 gradually decreases.

Moreover, the comparator 24 of the driving force control means 18 compares the behavior state estimation value Sb3 output from the behavior state estimating means 17B and the preset arbitrary threshold value Th with each other.

When it is judged in the comparator 24 that the behavior state estimation value Sb3 is smaller than the threshold value Th, the driving force control means 18 puts the driving force control flag up and, at the same time, outputs the drive command for controlling the driving force to at least one of the ECU of the engine 30A, the ECU of the transmission 30B, and the ECU of the motor 30C to decrease the driving force.

Figure 12:
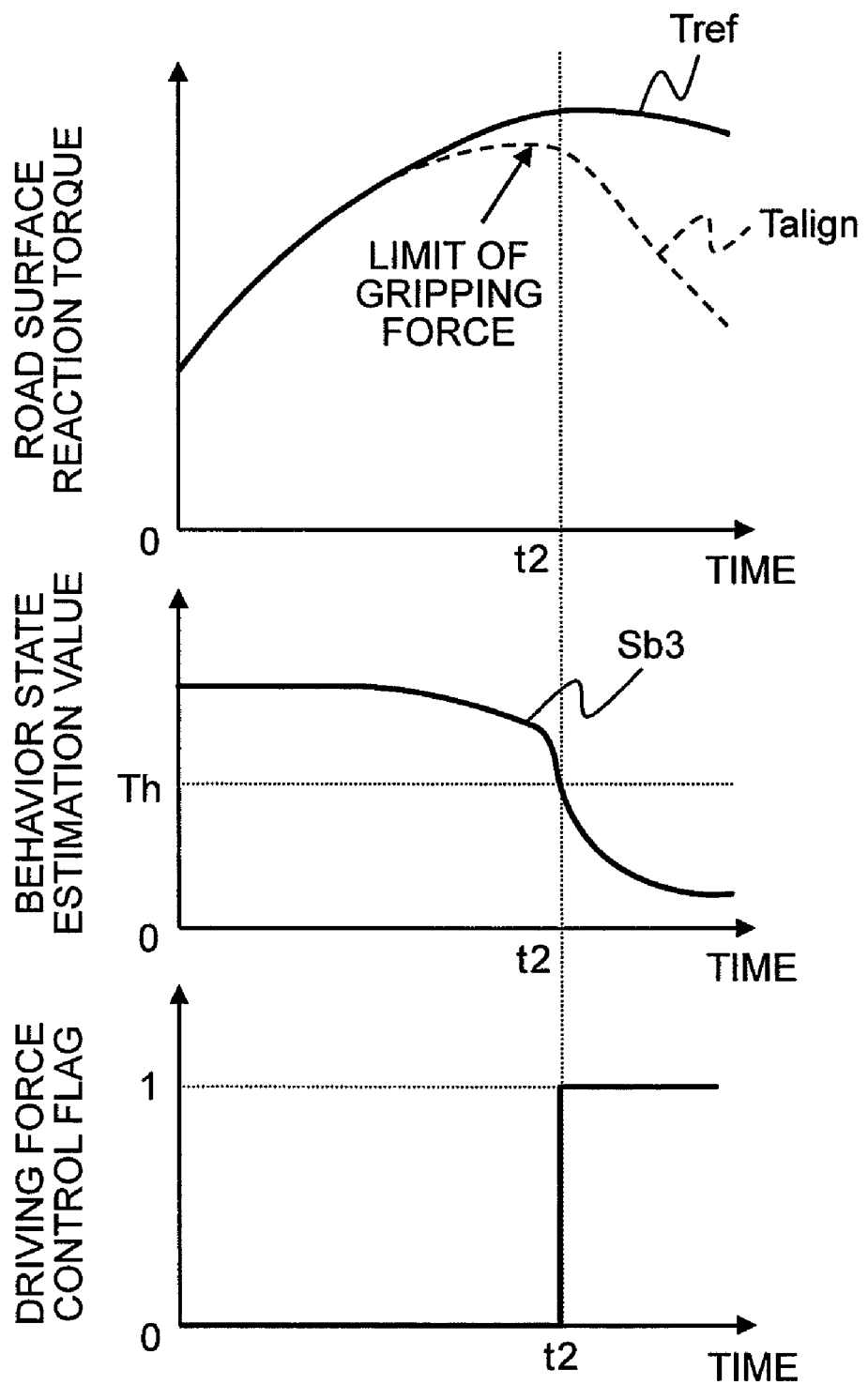
FIG. 12 A timing chart illustrating changes in a reference road surface reaction torque, an actual road surface reaction torque, a behavior state estimation value, and a driving force control flag of a vehicle control system according to the third embodiment of the present invention (Example 3).

FIG. 12 is a timing chart illustrating changes in the reference road surface reaction torque Tref, the actual road surface reaction torque Talign, the behavior state estimation value Sb3, and the driving force control flag of the vehicle control system according to the third embodiment of the present invention.

In FIG. 12, when the vehicle falls into the unstable state such as understeer, the behavior state estimation value Sb3 output from the behavior state estimating means 17B starts decreasing to be smaller than the threshold value Th at a time t2. Moreover, the driving force control means 18 puts the driving force control flag up at the time t2, and outputs the drive command for controlling the driving force to the driving means 30.

The other configuration and operation are the same as those of the first embodiment described above, and therefore, the description thereof is omitted.

According to the vehicle control system according to the third embodiment of the present invention, the same effects as those of the first embodiment described above can be produced.

EXAMPLE 4

Figure 13:
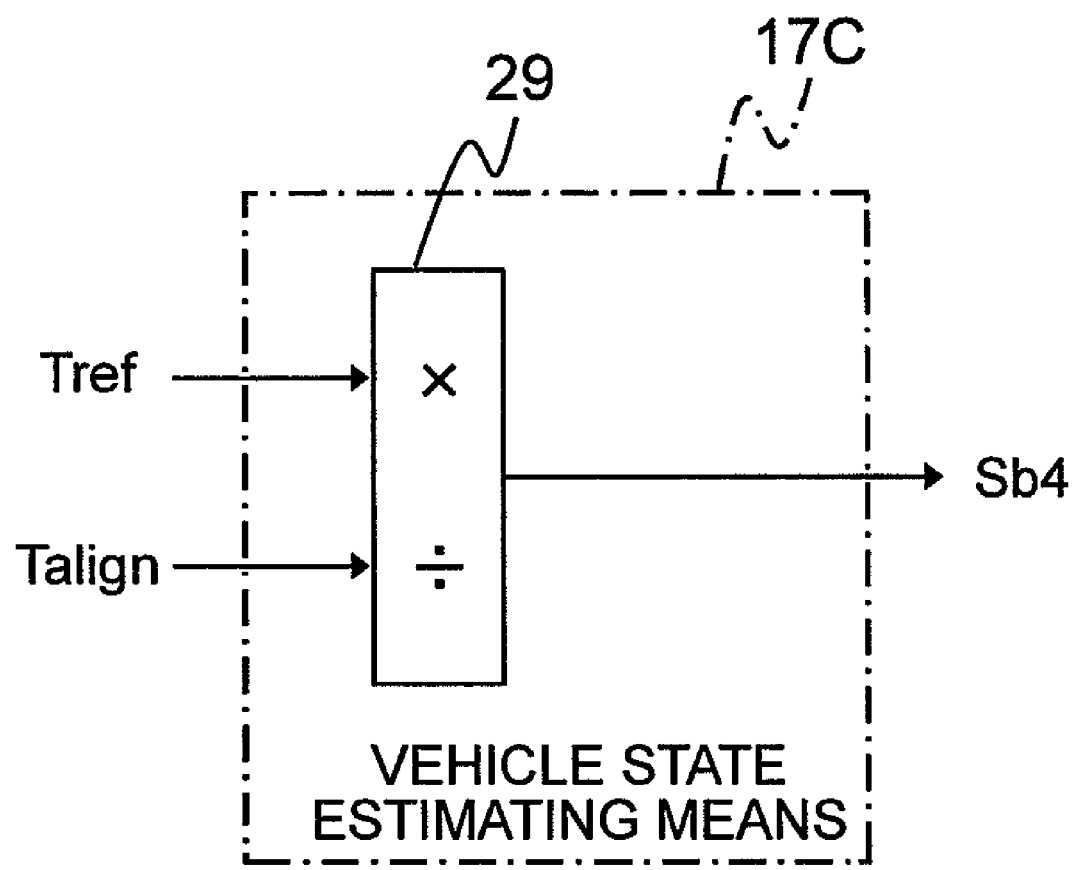
FIG. 13 A block diagram illustrating behavior state estimating means of a vehicle control system according to a fourth embodiment of the present invention (Example 4).

FIG. 13 is a block diagram illustrating behavior state estimating means 17C of a vehicle control system according to a fourth embodiment of the present invention.

In FIG. 13, the behavior state estimating means 17C includes a divider 28 for dividing the reference road surface reaction torque Tref by the actual road surface reaction torque Talign to obtain a ratio and outputting the obtained ratio as a behavior state estimation value Sb4.

Here, the behavior state estimation value Sb4 is expressed by the following Formula (13).

[Expression 7]

$$Sb4 = \frac{Tref}{Talign} \quad (13)$$

In Formula (13), since the actual road surface reaction torque Talign is saturated when the vehicle falls into the unstable state such as understeer, the behavior state estimation value Sb4 gradually increases.

Moreover, the comparator 24 of the driving force control means 18 compares the behavior state estimation value Sb4 output from the behavior state estimating means 17C and the preset arbitrary threshold value Th with each other.

When it is judged in the comparator 24 that the behavior state estimation value Sb4 is larger than the threshold value Th, the driving force control means 18 puts the driving force control flag up and, at the same time, outputs the drive command for controlling the driving force to at least one of the ECU of the engine 30A, the ECU of the transmission 30B, and the ECU of the motor 30C to decrease the driving force.

Figure 14:
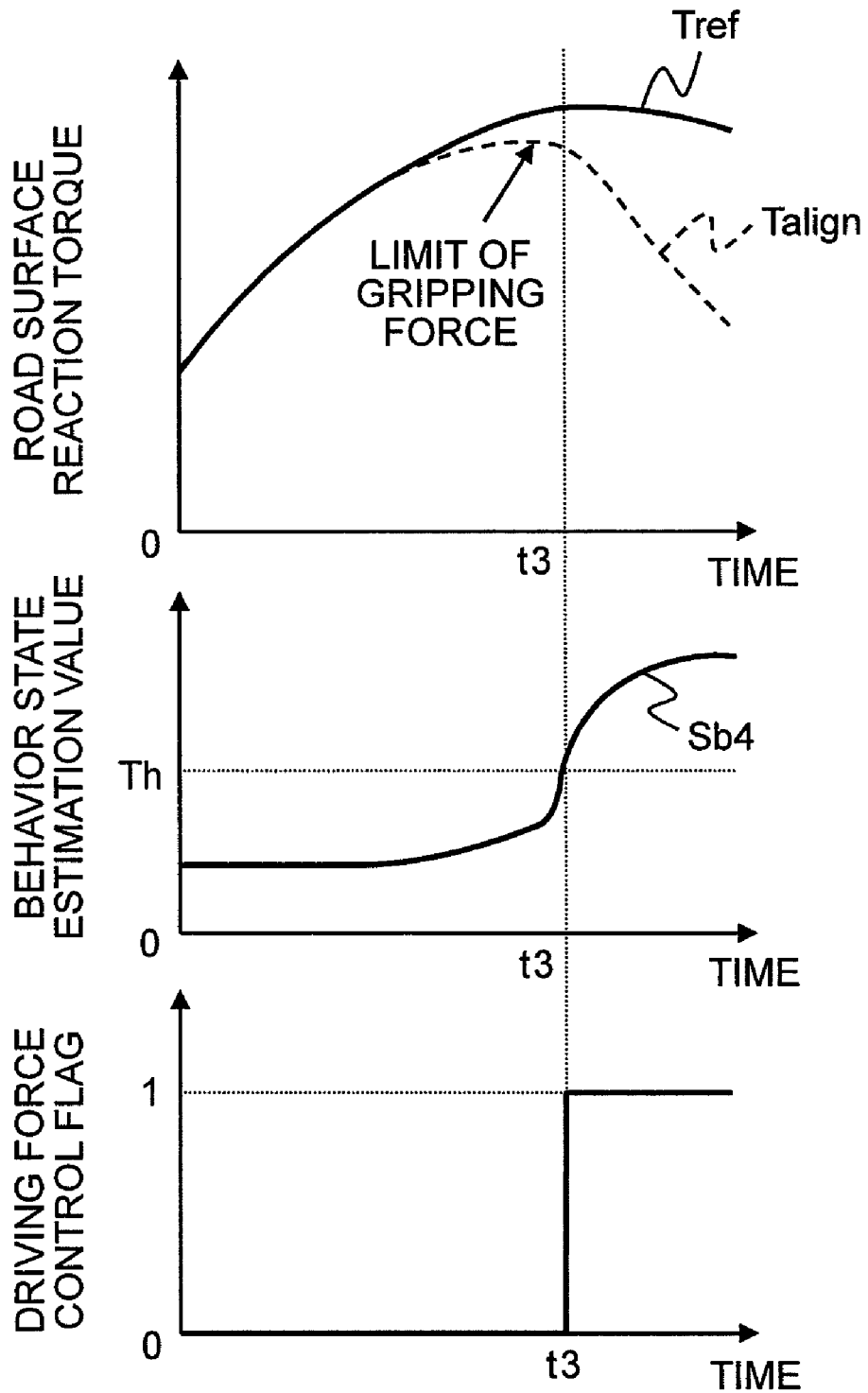
FIG. 14 A timing chart illustrating changes in a reference road surface reaction torque, an actual road surface reaction torque, a behavior state estimation value, and a driving force control flag of the vehicle control system according to the fourth embodiment of the present invention (Example 4).

FIG. 14 is a timing chart illustrating changes in the reference road surface reaction torque Tref, the actual road surface reaction torque Talign, the behavior state estimation value Sb4, and the driving force control flag of the vehicle control system according to the fourth embodiment of the present invention.

In FIG. 14, when the vehicle falls into the unstable state such as understeer, the behavior state estimation value Sb4 output from the behavior state estimating means 17C starts decreasing to be larger than the threshold value Th at a time t3. Moreover, the driving force control means 18 puts the driving force control flag up at the time t3, and outputs the drive command for controlling the driving force to the driving means 30.

The other configuration and operation are the same as those of the first embodiment described above, and therefore, the description thereof is omitted.

According to the vehicle control system according to the fourth embodiment of the present invention, the same effects as those of the first embodiment described above can be produced.

The behavior state estimating means 17 and 17A to 17C according to the first to fourth embodiments described above compute the deviation and the ratio between the actual road surface reaction torque Talign and the reference road surface reaction torque Tref individually. However, the computation of the behavior state estimation value is not limited thereto. The behavior state estimation value may be computed by combining the deviation and the ratio.

Even in this case, the same effects as those of the first to fourth embodiments described above can be produced.

The driving force control means 18 according to the first to fourth embodiments described above compares the behavior state estimation values Sb1 to Sb4 and the threshold value Th with each other to judge the limit of the actual road surface reaction torque Talign. However, the judgment of the limit of the actual road surface reaction torque is not limited thereto.

As described in, for example, Japanese Patent Application Laid-open No. 2005-324737, the driving force control means may correct the reference road surface reaction torque with the amount of correction based on the steering shaft reaction torque and the friction torque to compute an entire area road surface reaction torque estimation value, and may judge the limit of the actual road surface reaction torque based on the entire area road surface reaction torque estimation value.

Moreover, as described in, for example, Japanese Patent No. 3590608 and Japanese Patent Application Laid-open No. 2003-341538, a peak of the actual road surface reaction torque may be detected to judge the limit of the actual road surface reaction torque when the actual road surface reaction torque is saturated.

Even in the above-mentioned cases, the same effects as those of the first to fourth embodiments described above can be produced.

Although the road surface reaction torque detecting means 15 according to the first to fourth embodiments described above detects the actual road surface reaction torque Talign based on the steering torque Thdl, the vehicle speed V, the assist torque Tassist, and the steering speed ωs, the detection of the actual road surface reaction torque is not limited thereto.

The road surface reaction torque detecting means may be constituted by a load cell attached to the tire 9 to output the deformation of a strain gauge provided to the load cell as the actual road surface reaction torque.

Even in this case, the same effects as those of the first to fourth embodiments described above can be produced.

The invention claimed is:

1. A vehicle control system, comprising:
    road surface reaction torque detecting means for detecting an actual road surface reaction torque received by a tire of the vehicle from a road surface;
    steering angle detecting means for detecting a steering angle of a handle of the vehicle;
    vehicle speed detecting means for detecting a vehicle speed of the vehicle;
    reference road surface reaction torque computing means for computing a reference road surface reaction torque corresponding to a linear road surface reaction torque based on the steering angle and the vehicle speed;
    behavior state estimating means for estimating a behavior state of the vehicle based on at least one of a deviation and a ratio between the actual road surface reaction torque and the reference road surface reaction torque; and
    driving force control means for controlling a driving force of the vehicle according to the behavior state,
    wherein the road surface reaction torque detecting means is operative to detect an actual torque without input from a yaw rate detecting unit, and a front wheel slip angle estimating unit.

2. A vehicle control system, according to claim 1, further comprising:
    steering torque detecting means for detecting a steering torque by a driver of the vehicle;
    assist torque computing means for computing an assist torque for assisting the steering torque; and
    steering speed detecting means for detecting a steering speed of the handle by the driver,
    wherein the road surface reaction torque detecting means computes the actual road surface reaction torque based on the steering torque, the assist torque, the steering speed, and the vehicle speed.

3. A vehicle control system, according to claim 1, further comprising an engine for driving the vehicle,
    wherein the driving force control means controls an output of the engine according to the behavior state.

4. A vehicle control system, according to claim 1, further comprising a transmission for transferring a drive of the vehicle,
    wherein the driving force control means controls the transmission according to the behavior state.

5. A vehicle control system, according to claim 1, further comprising a motor for driving the vehicle,
wherein the driving force control means controls an output of the motor according to the behavior state.

6. A vehicle control system, according to claim 1, wherein the road surface reaction torque detecting means consists of a load cell.

7. A vehicle control system, comprising:
road surface reaction torque detecting means for detecting an actual road surface reaction torque received by a tire of the vehicle from a road surface;
steering angle detecting means for detecting a steering angle of a handle of the vehicle;
vehicle speed detecting means for detecting a vehicle speed of the vehicle;
reference road surface reaction torque computing means for computing a reference road surface reaction torque corresponding to a linear road surface reaction torque based on the steering angle and the vehicle speed;
behavior state estimating means for estimating a behavior state of the vehicle based on at least one of a deviation and a ratio between the actual road surface reaction torque and the reference road surface reaction torque; and
driving force control means for controlling a driving force of the vehicle according to the behavior state,
wherein the road surface reaction torque detecting means is operative to detect an actual torque without input from a front wheel slip angle estimating unit.

8. A vehicle control system, according to claim 7, further comprising:
steering torque detecting means for detecting a steering torque by a driver of the vehicle;
assist torque computing means for computing an assist torque for assisting the steering torque; and
steering speed detecting means for detecting a steering speed of the handle by the driver,
wherein the road surface reaction torque detecting means computes the actual road surface reaction torque based on the steering torque, the assist torque, the steering speed, and the vehicle speed.

9. A vehicle control system, according to claim 7, further comprising an engine for driving the vehicle,
wherein the driving force control means controls an output of the engine according to the behavior state.

10. A vehicle control system, according to claim 7, further comprising a transmission for transferring a drive of the vehicle,
wherein the driving force control means controls the transmission according to the behavior state.

11. A vehicle control system, according to claim 7, further comprising a motor for driving the vehicle,
wherein the driving force control means controls an output of the motor according to the behavior state.

12. A vehicle control system, according to claim 7, wherein the road surface reaction torque detecting means consists of a load cell.

* * * * *